United States Patent [19]

Dawes et al.

[11] Patent Number: 5,153,152

[45] Date of Patent: Oct. 6, 1992

[54] MULTICOMPONENT CERAMIC MATRIX COMPOSITES

[75] Inventors: Steven B. Dawes, Corning; John L. Stempin, Beaver Dams; Dale R. Wexell, Corning, all of N.Y.

[73] Assignee: Corning Incorporated, Corning, N.Y.

[21] Appl. No.: 770,876

[22] Filed: Oct. 4, 1991

[51] Int. Cl.⁵ .............................................. C04B 35/02
[52] U.S. Cl. ...................................... 501/95; 501/32; 501/8; 501/9; 428/113; 428/367
[58] Field of Search ............ 501/95, 32, 35, 17, 501/8, 9; 428/113, 114, 294, 295, 367

[56] References Cited

U.S. PATENT DOCUMENTS

| | | | |
|---|---|---|---|
| 4,511,663 | 4/1985 | Taylor | 501/4 |
| 4,615,987 | 10/1986 | Chyung et al. | 501/8 |
| 4,919,991 | 4/1990 | Gadkaree | 421/113 |
| 4,992,318 | 2/1991 | Gadkaree | 428/114 |
| 5,039,635 | 8/1991 | Stempin et al. | 501/95 |

*Primary Examiner*—Karl Group
*Assistant Examiner*—Chris Gallo
*Attorney, Agent, or Firm*—Kees van der Sterre

[57] ABSTRACT

A fiber-reinforced ceramic matrix composite article comprising fiber-reinforced surface portions disposed on a ceramic core, the core differing in composition and high temperature properties from the surface portions and the fibers present in the surface portions being of a type normally subject to oxidative deterioration at high temperature, wherein the fibers in the surface portion are provided with protection from high temperature oxidative deterioration such that excellent strength and resistance to high temperature embrittlement are achieved for the composite as a whole.

10 Claims, No Drawings

MULTICOMPONENT CERAMIC MATRIX COMPOSITES

BACKGROUND OF THE INVENTION

The present invention relates to ceramic matrix composites and more particularly to ceramic matrix composites of complex structure combining core and surface components of differing composition and properties.

Ceramic matrix composites may be generally characterized as composite bodies comprising a matrix of a ceramic material, which may be a glass, a crystalline ceramic, or a glass-ceramic, within which is disposed a reinforcing material consisting of fibrous or particulate additives having different properties than the matrix and imparting improved strength or toughness thereto. Typical of these composites are fiber-reinforced glass-ceramic composites wherein the matrix is a glass-ceramic and the reinforcement consists of refractory inorganic fibers such as silicon carbide (e.g., silicon oxycarbide) fibers. U.S. Pat. Nos. 4,485,179 and 4,554,197 describe some of these materials.

Prospective uses for fiber-reinforced ceramic matrix composites such as described in these and other prior patents and literature include use as structural elements in high temperature environments such as heat engines. The materials to be employed for such applications must exhibit particularly good strength and toughness at elevated temperature.

An important problem which has been identified in silicon-carbide-reinforced ceramic matrix composites, arising upon exposure to temperatures in the 800°–1200° C. range in an oxidizing environment, is that referred to as oxidation embrittlement. Instead of exhibiting the high toughness and strength of the as-made material, the oxidized material becomes brittle and subject to sudden catastrophic breakage. R. L. Stewart et al. in "Fracture of SiC Fiber/Glass-Ceramic Composites as a Function of Temperature," *Fracture Mechanics of Ceramics*, R. C. Bradt et al. Ed., Volume 7, pages 33–51, Plenum (New York) 1986, attribute oxidation embrittlement to oxidative deterioration of the fiber-matrix interface.

Two fundamentally different approaches to the solution of oxidation embrittlement in silicon-carbide-fiber reinforced glass ceramics have been developed, i.e., the use of fiber coatings and the use of hybrid matrix reinforcements. Fiber coating approaches include the use of vapor-deposited boron nitride coatings, as described in U.S. Pat. No. 4,642,271, and the use of sheet silicate coatings as described in U.S. Pat. No. 4,948,758. Such coatings, hereinafter referred to broadly as oxidation-resistant coatings, are intended to provide an oxidatively stable phase that preserves an effective interface between the fiber and the matrix at high temperatures.

The hybrid reinforcement approach relies on the inclusion of secondary reinforcement phases such as silicon carbide whiskers, particles, or chopped fibers, in addition to the primary reinforcement fibers, in the ceramic matrix. The aim is to provide a toughened matrix that deflects and/or blunts cracks, thereby resisting matrix microcracking at low and moderate loads. Since oxidation embrittlement proceeds rapidly only following the appearance of microcrack damage, composites with hybrid reinforcement can generally tolerate higher stress levels prior to the onset of such embrittlement. U. S. Pat. No. 4,615,987 describes hybrid glass-ceramic matrix composites containing fibers with secondary whisker additions, while U.S. Pat. No. 4,626,515 discloses the similar hybrid fiber/whisker reinforcement of glasses.

Each of the two approaches to the oxidation embrittlement problem have drawbacks. Fiber coatings can raise the oxidation embrittlement temperature, but the composites exhibit relatively low microcrack yield points and, in some instances, reduced refractoriness resulting in deformation of the part at high temperatures. A high microcrack yield point, defined as the lowest stress under transverse loading at which non-linear stress/strain behavior (caused by matrix microcracking) appears, is desirable since the microcrack yield point is generally accepted as the maximum load at which a component would be designed to be used. Part deformation at high temperatures is undesirable for applications wherein composite parts must meet close dimensional tolerances.

On the other hand, composites with hybrid reinforcement have high microcrack yield points, but generally lower ultimate failure stresses and strains. This may be due to fiber damage inflicted by the whiskers during the processing of the hybrid, or to other factors.

Attempts to improve ultimate stress/strain in hybrid composites by using combinations of coated fibers and whisker additions have yielded some improvements in properties, but have not completely solved the problem. Limited refractoriness and lower than optimum ultimate strength are still frequently observed.

In U.S. Pat. No. 4,992,318, a lamination approach to composite fabrication was proposed wherein, to protect the ultimate strength of the composite, whisker and/or chopped fiber additives were confined to specified layers during fabrication. However, this approach requires careful control over the relative elasticity of the layers in order to avoid brittle fracture behavior in the composite product.

SUMMARY OF THE INVENTION

The present invention provides a fiber-reinforced ceramic matrix composite incorporating two or more ceramic layers or layer groups of differing composition. These layers or layer groups form core and surface portions of the composite article, each portion exhibiting properties which compliment the properties of the other portion, such that the product exhibits ambient or high temperature performance substantially better than could be achieved utilizing either of the compositions alone. The difference in composition between the surface and core portions of the article may reside in the use of different matrix materials or different reinforcing fibers or fiber combinations. The reinforcing fibers may differ in base composition, or they may differ only in fiber surface composition, for example as the result of the application of surface coatings or other surface treatments to the fibers in one of the core or surface portions.

In one embodiment, then, the invention includes a ceramic matrix composite article comprising a ceramic matrix reinforced with refractory inorganic fibers, the article comprising a first ceramic material forming a core portion of the article and a second fiber-reinforced glass-ceramic material forming a surface portion of the article. The fiber-reinforced material forming the surface portion, which is so designated because it is configured to at least partially cover the core portion, differs in composition (and therefore properties) from the material forming the core portion of the article. The key feature of the surface portion composition is that the inorganic fibers present in the surface portion are fibers which have been protected from oxidative deterioration.

In a preferred embodiment the first ceramic material (forming the core portion of the article) will be a fiber-reinforced glass-ceramic composite material differing in properties from the fiber-reinforced glass-ceramic material of the surface portion. Preferably, the core will have a structural composition which is selected from between two fundamental types. The first type comprises a silicate glass-ceramic matrix reinforced with silicon carbide fibers and the second type comprises a silicate glass-ceramic matrix reinforced with a combination of reinforcements, that combination including both silicon carbide fibers and a toughening addition of inorganic chopped fibers or whiskers.

By silicon carbide fibers is meant long silicon carbide or silicon oxycarbide fibers (greater than 1 cm and more preferably tens of cm. or more in length), these typically being aligned parallel to a common axis or plane in the material to provide high strength in that axis or plane. The whiskers and chopped inorganic fibers forming the toughening addition, on the other hand, are conventionally quite short (less than 1 mm, preferably less than 200 $\mu$m, in length).

The second glass-ceramic material (forming the surface portion of the article) comprises a glass-ceramic matrix reinforced with oxidation-protected inorganic fibers, most preferably oxidation-protected silicon carbide fibers. These are typically fibers provided with an oxidation-resistant surface coating thereon, to prevent or retard oxidation damage to the fibers at high temperatures. This second or surface glass-ceramic material is generally substantially free of toughening additives of inorganic whiskers and chopped fibers.

Composite products incorporating diverse core and surface portions in accordance with the above principles generally exhibit excellent strength and toughness at high temperatures. Particularly unexpected is the finding that, especially at high temperatures, higher ultimate strengths are observed in some of the inventive composites than are observed in either of the materials used to form them. And, the high temperature strengths of others of the inventive composite products equal the high temperature strengths of the strongest components thereof even where such components comprise only minor proportions of the product.

While particularly effective in the field of fiber-reinforced glass-ceramics, the utility of the invention is deemed to extend beyond composites composed only of these materials. Compatible core materials differing in composition from the surface glass-ceramic but composed of other composite ceramics, or even of compatible monolithic ceramics, are also expected to benefit from the application of glass-ceramic surface layers incorporating oxidation-protected reinforcing fibers, i.e., fibers which are supplied by suitable means with effective protection from high temperature oxidative deterioration.

DETAILED DESCRIPTION

As previously noted, standard conventional high-strength fiber-reinforced composites, typified by a structure consisting of a glass-ceramic matrix material containing silicon carbide fibers (e.g., Nicalon ® silicon oxycarbide fibers), exhibit embrittlement and greatly reduced strength under flexural testing at 1200° C. On the other hand, similarly constructed conventional composites wherein the fibers are first provided with oxidation-resistant coatings show less embrittlement and better strengths at 1200° C., but are less refractory. In fact, the reduced embrittlement of these oxidation-protected fiber composites is attributed in part to the fact that they will deform at high temperatures. The so-called hybrid composites, comprising both fibers and toughening whiskers additions, will resist microcracking but have relatively low ultimate strength.

Table I below sets forth physical properties for some fiber-reinforced glass-ceramics of conventional type. These composites include a conventional composite type comprising only silicon carbide fibers in a glass-ceramic matrix (Standard type), an oxidation-protected fiber composite wherein the fibers are provided with an oxidation-resistant surface layer (Coated F type), and a hybrid composite comprising a combination of silicon carbide fibers and silicon carbide whiskers (Hybrid type).

Each of these conventional samples comprised 12 plies of fiber reinforced glass-ceramic, each ply consisting of Nicalon ® NLM-202 fiber tow encased in an alkaline earth aluminosilicate glass-ceramic matrix. For each sample, the plies were consolidated together at temperatures in the 1200°–1340° C. range at a pressure of 1500 psi. to form a unitary composite wherein the fibers constituted about 35-45% by volume of the material.

Table I reports the results of flexural testing to the point of failure of these conventional 12-ply composite samples in four-point bending at a test temperature of 1200° C. Included in the test data are the composite consolidation temperature, the applied stress and sample elongation at the microcrack yield point ($S_{mcy}$ and $E_{mcy}$ respectively), the applied stress and sample elongation at the point of ultimate sample failure ($S_{ult}$ and $E_{ult}$ respectively), and the bending (flexural) modulus ($E_b$) of the composites which is the ratio of the sample stress to sample elongation (strain) at the microcrack yield point of the sample.

TABLE I

| Sample Type | Consol. Temp (°C.) | 1200° C. Properties | | | | |
| --- | --- | --- | --- | --- | --- | --- |
| | | $S_{mcy}$ (Ksi) | $E_{mcy}$ (%) | $S_{ult}$ (Ksi) | $E_{ult}$ (%) | $E_b$ Msi |
| Standard | 1340 | 19.3 | 0.17 | 47.0 | 0.43 | 11.18 |
| Coated F. | 1200 | 5.8 | 0.07 | 70.0 | 1.36 | 8.48 |
| Hybrid | 1250 | 12.6 | 0.14 | 61.8 | 0.98 | 8.98 |

As would be anticipated from known properties, each of the composites above described shows significant strength deterioration based on the room temperature strength of a fiber-reinforced composite of conventional (Standard) type, these typically showing an ultimate room temperature strength ($S_{ult}$) of 100 Ksi. The coated fiber sample incorporating fiber oxidation protection retains the highest proportion of ultimate strength, but undergoes microcracking at low applied stress and shows high sample elongation (deformation) at the point of failure. The hybrid sample exhibits a higher microcrack point but is relatively weak.

These results contrast markedly with those provided by composites produced in accordance with the invention, including composites fabricated utilizing the same ply materials as used above. Hence assembly of the same ply types to provide composite laminates with appropriate core and surface characteristics produces products offering substantial overall improvements in high temperature performance. At the same time, the selection of matrix and fiber reinforcements is not limited to those particular matrix and fiber materials, but instead may be made from a rather wide variety of fiber and matrix materials known to the art.

The processing of fiber and matrix materials to produce composite products in accordance with the invention does not differ from conventional procedures. The following Example sets forth typical procedures for the fabrication of such composites.

EXAMPLE—COMPOSITE FABRICATION

Commercially available silicon carbide fiber tows are selected for use as a fiber reinforcing material. The fiber tows selected are Nicalon ® NLM-202 silicon oxycarbide fiber tows, manufactured by the Nippon Carbon Company of Tokyo, Japan, or Tyrano ™ silicon carbide tows manufactured by Ube Industries Ltd. of Tokyo, Japan.

Some of the fiber tows thus provided are used to make oxidation-protected fiber. A boron nitride surface coating is applied to the surfaces of the fibers in the selected tows by known prior art chemical vapor deposition procedures. The coating method described in U.S. Pat. No. 4,642,271 is representative. Optionally, following application of this coating, an alumina overcoating is applied to the vapor-deposited boron nitride coating on some of the tows by a double immersion of the coated tow into a clear alumina sol, each immersion being followed by drying and firing of the tow at 275° C. The treated fiber tows thus provided, comprising surface coatings of BN alone or BN with alumina, exhibit good resistance to high temperature oxidation embrittlement in a ceramic matrix environment.

A powdered glass suitable for forming a glass-ceramic matrix is next selected. The selected powdered glass has an average particle size of about 10 microns, is of alkaline earth aluminosilicate composition, and can be thermally crystallized by heat treatment to a glass-ceramic wherein anorthite and alumina constitute the principal crystal phases.

The powdered glass thus selected can be used alone as a composite matrix material, or it may be modified by the addition of a silicon carbide whisker component to increase the microcrack yield strength of the matrix. A commercially available silicon carbide whisker material, sold as SC-9 silicon carbide whiskers by the Advanced Composite Materials Corporation, Greer, South Carolina, is thus selected for use as an optional matrix additive for composite fabrication. Additions of about 10% of whiskers by weight to the powdered glass matrix provides satisfactory results from the standpoint of matrix toughening.

Plies suitable for the construction of composites in accordance with the invention may be fabricated by conventional methods. Generally, the selected tow material (as purchased or supporting one of the above-described oxidation-protective coatings) is immersed in a liquified suspension of the powdered glass matrix material. The matrix suspension, which comprises the powdered glass with or without a 10% (weight) addition of silicon carbide whiskers dispersed in a liquid organic binder, infiltrates the fiber tows. The tows are then withdrawn from the binder and collected by winding onto a drum or other support to form an accumulation of matrix-impregnated tow subsequently referred to as "prepreg". This prepreg is thereafter cut from the drum and flattened to form prepreg mat, each mat forming a ply in a prepreg stack to be consolidated onto a ceramic matrix composite product such as a composite panel, bar or plate.

Utilizing the above procedure, prepregs of several different ply types are prepared. These include (i) "Standard" prepreg plies, comprising uncoated Nicalon ® or Tyranno ™ fibers disposed in a 100% powdered aluminosilicate glass matrix, (ii) coated fiber or Oxidation-Protected prepreg plies, comprising the one of C the above-described types of protectively coated Nicalon ® fibers disposed in a 100% powdered aluminosilicate glass matrix, and (iii) fiber+whisker or "Hybrid" prepreg plies, comprising Nicalon ® fiber plies in a matrix consisting of 90% powdered glass and 10% of silicon carbide whiskers by weight. For physical protection from the whiskers, the fibers to be incorporated in some of the Hybrid plies are provided with buffering surface layers of pyrolytic carbon in accordance with procedures such as described in U.S. Pat. No. 5,039,635. Plies of this type are referred to as Buffered Hybrid plies.

Composite plate preforms are next constructed by forming stacks of the various plies, the plies in each stack being selected to provide core and surface plies of the desired composition. The typical preform stack comprises 10 or more of the plies, with at least the top and bottom plies in each stack normally being oxidation-protected plies. For highest strong-axis strength and stiffness, all of the plies in each of the stacks are positioned with the fiber tows therein aligned along a common axis.

After each stack has been formed, it is processed through a binder burnout heat treatment in air to remove organic binders from the prepreg, and is then consolidated under pressure in a nitrogen atmosphere at a temperature of 1250° C. or 1340° C. The consolidation process effectively converts each stack to a dense, substantially void-free fiber-reinforced composite article wherein the powdered glass matrix material has been crystallized to a fine-grained glass-ceramic of anorthite/alumina crystallinity.

Following the procedure of the Example as above set forth, a number of different composite structures offering improved high temperature strength and dimensional stability may be provided. Table II below illustrates several useful constructions for such composites, wherein the plies utilized are selected from among the following ply types produced as above described: Standard (Std), Oxidation Protected (OP, or OPa with added alumina overcoat), Hybrid (Hy) and Buffered Hybrid (HyB). For each example, the number of plies of each type is reported, along with the consolidation temperature used to consolidate the ply stacks to composite plates and the density of the resulting plates.

TABLE II

| | Composite Designs | | | |
|---|---|---|---|---|
| Sample ID No. | Surface\|Core\|Surface | Press Ply Count | Sample Temp. (°C.) | Density (g/cc) |
| 1 | OPa\|Std\|OPa | 2\|7\|2 | 1340 | 2.662 |
| 2 | OPa\|Std\|OPa | 3\|5\|3 | 1340 | 2.678 |
| 3 | OPa\|Std\|OPa | 1\|9\|1 | 1340 | 2.700 |
| 4 | OPa\|Std\|OPa | 2\|7\|2 | 1340 | 2.632 |
| 5 | OPa\|Std\|OPa | 1\|9\|1 | 1340 | 2.612 |
| 6 | OPa\|HyB\|OPa | 1\|10\|1 | 1250 | 2.557 |
| 7 | OPa\|HyB\|OPa | 2\|8\|2 | 1250 | 2.600 |

TABLE II-continued

| | Composite Designs | | | |
|---|---|---|---|---|
| Sample ID No. | Surface\|Core:Surface | Press Ply Count | Sample Temp. (°C.) | Density (g/cc) |
| 8 | OPa\|HyB\|OPa | 2\|8\|2 | 1250 | 2.550 |
| 9 | OPa\|HyB\|OPa | 3\|6\|3 | 1250 | 2.606 |
| 10 | OPa\|HyB\|OPa | 3\|6\|3 | 1250 | 2.597 |
| 11 | OP\|Std\|Hy\|Std\|OP | 2\|1\|6\|1\|2 | 1340 | 2.627 |
| 12 | OP\|Std\|Hy\|Std\|OP | 2\|2\|4\|2\|2 | 1340 | 2.630 |
| 13 | Alt. OP\|H\|OP | 1\|1\|1\|... | 1340 | 2.609 |

Composite plates produced as described are tested in flexure for microcrack yield performance and ultimate strength both at room temperature and at elevated temperatures of 1000° C. and 1200° C. Fully consolidated 12-ply samples, each approximately 0.080 inches in thickness, are tested in 4-point bending along the strong axis of the sample (the direction of fiber alignment). The tests are performed with an upper knife-edge span of 2.5", a lower span of 1.25", and a displacement rate of 1 mm/min.

Typical results for such testing are reported in Table III below. Included in Table III are values for the applied stress and sample elongation at the microcrack yield point ($S_{mcy}$ and $E_{mcy}$ respectively), as well as the applied stress and sample elongation at the point of ultimate sample failure $S_{ult}$ and $E_{ult}$ respectively).

TABLE III

| | Composite Flexure Tests | | | | | |
|---|---|---|---|---|---|---|
| Sample ID | Test Temp (°C.) | $S_{mcy}$ (Ksi) | $E_{mcy}$ (%) | $S_{ult}$ (Ksi) | $E_{ult}$ (%) | $E_b$ Msi |
| 1 | 25 | 18.7 | 0.56 | 111.7 | 1.21 | 13.98 |
| Core: Std. | 1000 | 16.5 | 0.15 | 73.3 | 0.78 | 11.18 |
| Surf: 2-ply | 1200 | 9.1 | 0.11 | 86.8 | 1.35 | 8.20 |
| 2 | 25 | 19.0 | 0.13 | 114.0 | 1.26 | 14.15 |
| Core: Std. | 1000 | 12.1 | 0.12 | 88.3 | 1.04 | 10.31 |
| Surf: 3-ply | 1200 | 8.8 | 0.12 | 76.1 | 1.27 | 7.28 |
| 3 | 25 | 25.9 | 0.15 | 135.6 | 1.20 | 17.05 |
| Core: Std. | 1000 | 41.8 | 0.32 | 69.8 | 0.58 | 12.97 |
| Surf: 1-ply | 1200 | 16.5 | 0.15 | 87.0 | 0.93 | 10.98 |
| 4 | 25 | 24.6 | 0.16 | 119.3 | 1.12 | 15.83 |
| Core: Std. | 1000 | 41.3 | 0.35 | 88.9 | 0.87 | 11.91 |
| Surf: 2-ply | 1200 | 14.4 | 0.15 | 90.7 | 1.31 | 9.45 |
| 5 | 25 | 26.7 | 0.17 | 99.5 | 0.93 | 15.84 |
| Core: Std. | 1000 | 42.4 | 0.34 | 66.5 | 0.60 | 12.31 |
| Surf: 1-ply | 1200 | 15.1 | 0.15 | 73.1 | 0.93 | 10.06 |
| 6 | 25 | 23.5 | 0.15 | 78.8 | 0.60 | 15.72 |
| Core: HyB | 1000 | 27.8 | 0.22 | 28.0 | 0.23 | 12.53 |
| Surf: 1-ply | 1200 | 13.6 | 0.12 | 39.6 | 0.41 | 11.62 |
| 7 | 25 | 36.4 | 0.22 | 85.0 | 0.61 | 16.34 |
| Core: HyB | 1000 | 75.4 | 0.41 | 98.2 | 1.00 | 12.39 |
| Surf: 2-ply | 1200 | 10.7 | 0.11 | 71.3 | 0.99 | 9.90 |
| 9 | 25 | 39.0 | 0.23 | 72.7 | 0.50 | 16.90 |
| Core: HyB | 1000 | 14.4 | 0.20 | 104.5 | 1.05 | 11.30 |
| Surf: 3-ply | 1200 | 13.7 | 0.14 | 72.9 | 0.98 | 9.36 |
| 11 | 25 | 40.6 | 0.25 | 88.9 | 0.65 | 16.41 |
| Core: Mix. | 1000 | 8.1 | 0.16 | 94.7 | 0.98 | 14.92 |
| Surf: 2-ply | 1200 | 12.1 | 0.11 | 64.1 | 0.75 | 11.26 |
| 12 | 25 | 12.4 | 0.53 | 46.2 | 0.30 | 15.36 |
| Core: Mix. | 1000 | 30.1 | 0.24 | 82.1 | 0.79 | 12.30 |
| Surf: 2-ply | 1200 | 16.6 | 0.17 | 55.9 | 0.69 | 9.58 |

As previously noted, composites such as those above described can offer significant advantages over prior art composites in terms of cost and/or performance. A principal economic consideration relates to the cost of fiber tow material made up of oxidation-protected (coated) fibers. Whether applied by vapor deposition or solution methods, the processing and materials costs incurred in fiber coating substantially increase the cost of the finished composite. Advantageously, the surface portions of the composites of the invention need comprise only about 10–50% by volume thereof, thus limiting the quantity of expensive oxidation-protected fiber plies required. Yet they can offer ambient and/or high temperature performance characteristics equivalent or superior to those of composites comprising 100% of the such oxidation protected fibers.

Some instances of higher-than-expected flexural strength were in fact observed in some of these systems. Thus, for example, the 1200° C. ultimate flexural stress values observed for Samples 1–5 were larger than observed for either of the component materials, this increase being particularly significant in the cases of Samples 1,3 and 4. Also noteworthy in the case of Samples 4 and 5, which employed Tyranno ™ silicon carbide fibers in the core portion of the composite, were unexpectedly high 25° C. ultimate flexural stress values; composites formed of this core composition alone generally show relatively low room temperature strengths.

Certain of the inventive composites also provide advantages in terms of reduced deformation under high temperature stress. Thus, for example, the failure strain value of 0.93% reported for one of the standard core composites of the invention at 1200° C. compares very favorably with the failure strain of approximately 1.4% reported above for the conventional 12-ply composite containing only oxidation-protected fibers.

Although inventive composites comprising hybrid core plies generally do not exhibit the substantial strength enhancements shown by composites incorporating standard core plies, high elastic moduli and better interlaminar strength, relative to standard fiber reinforced composites, are typical of these materials. And the strain tolerance of hybrid-core composites is greatly improved over that of the relatively brittle all-hybrid composites of the prior art.

Improvements in strain tolerance are best shown by pure tension testing of these materials, i.e., by applying tensile stress to composite samples along the axis of fiber reinforcement, rather than flexural stress transverse to that axis. Tension tests are conventionally performed on untabbed specimens of selected samples, with brass shims being used for specimen surface protection. Span to depth ratios are maintained at about 30:1, with tension being applied at a strain rate of about 2%/min. All tests are carried out at room temperature.

A 12-ply all-hybrid composite specimen recorded a failure strain of about 0.2%, at an applied stress of 30 Ksi, in this test. In contrast, failure strains on the order of 0.6%, at applied stresses in the range of 50–60 Ksi, appear to be more typical of hybrid core composites such as Examples 7–10 in Table II. Applications involving high tensile stress, and requiring both good oxidation protection and improved strain tolerance, will thus benefit greatly from the utilization of these improved composite materials.

Although composites comprising oxidation protected surface plies covering all or substantially all of the core are preferred in most cases, some applications may require that only selected portions of the core, e.g., one surface of a sheet or plate, be provided with such plies. For those applications, the oxidation-protected surface ply or plies will normally be applied to the composite surface which, in use, will be subjected to the higher tensional stress. We have found no significant advantages in terms of high temperature strength to reside in composite designs wherein the oxidation-protected plies are covered, or are disposed on surfaces not subjected to tensile stress in use.

Illustrative of these results, samples of a nine-ply composite configuration were subject to flexural strength tests. These samples comprised a 6-ply core or base portion of buffered fiber hybrid construction and, on only one surface of the core, a surface portion consisting of a 3-ply composite incorporating oxidation-protected fibers.

These samples were tested in four-point bending following the test procedures above described; some of the tests were carried out with the oxidation-protected surface portion in tension, and other tests were conducted with the hybrid base portion in tension.

Table IV below sets forth representative results for such tests at test temperatures of 25° C. and 1000° C. Included in Table IV for each of the tests conducted are the test temperature employed, an identification of the sample surface which was in tension during the test, whether the oxidation-protected surface (Oxy. P.) or the hybrid surface, the applied stress at the microcrack point ($S_{mcy}$), and the applied stress ($S_{ult}$) and sample elongation ($E_{ult}$) recorded at at the point of ultimate sample failure.

TABLE IV

| Sample ID | Test Temp (°C.) | Tensional Surface | $S_{mcy}$ (Ksi) | $S_{ult}$ (Ksi) | $E_{ult}$ (%) |
|---|---|---|---|---|---|
| 14 | 25 | Hybrid | 42 | 97 | 0.67 |
| 15 | 25 | Oxy. P. | 40 | 129 | 1.01 |
| 16 | 1000 | Hybrid | 39 | 39 | 0.32 |
| 17 | 1000 | Oxy. P. | 53 | 116 | 1.17 |
| 18 | 1000 | Oxy. P. | 46 | 121 | 1.22 |

As is evident from a study of the data in Table IV, significantly better properties are observed, particularly at 1000° C., in cases where the oxidation-protected material is disposed on the composite surface placed under tensional stress. In fact, the samples tested with the hybrid material bearing the flexural tension exhibited properties which were substantially equivalent to those of all-hybrid composites, such that no benefit from the incorporation of oxidation-protected material into the composites was realized.

While composite performance is strongly influenced by the placement of the oxidation-resistant ply components, the invention is not intended to be limited to any particular oxidation protection or glass-ceramic matrix system. In the case of the glass-ceramic matrix, for example, any of a wide variety of glass-ceramics having utility for the fabrication of fiber-reinforced composites may be used.

For the most difficult applications, i.e., those requiring high strength and toughness at particularly high temperatures in an oxidizing environment, refractory alkaline earth aluminosilicate glass-ceramics are among the most preferred of matrix materials. Such glass-ceramics include those wherein the predominant crystal phase is selected from the group of anorthite ($CaO.Al_2O_3.2SiO_2$) and its pseudo-binaries with mullite ($3Al_2O_3.SiO_2$), cordierite ($2MgO.2Al_2O_3.5SiO_2$), barium osumilite ($BaO.2MgO.3Al_2O_3.9SiO_2$), albite solid solution ($Na_2O.Al_2O_3.6SiO_2$), $Al_2O_3$, $SiO_2$, $CaO.SiO_2$, and gehlenite ($2CaO.Al_2O_3.SiO_2$).

Alternative glass-ceramics of this type include those comprising a predominant crystal phase consisting essentially of triclinic anorthite in solid solution with at least one of mullite and alpha alumina, e.g., mixed anorthite-alumina as the principal crystalline phase. Still another class of alkaline earth aluminosilicate glass-ceramics useful in accordance with the invention are those wherein the principal crystal phase is selected from the group consisting of barium osumilite, cordierite, and stuffed cordierite. Some barium osumilite and barium-stuffed cordierite glass-ceramics are disclosed in U.S. Pat. No. 4,464,475; alternative species which may replace barium in barium-stuffed cordierite include CaO, SrO and $Cs_2O$.

The fiber reinforcement utilized in the ceramic matrix composites of the invention is most preferably silicon carbide or silicon oxycarbide fiber. This fiber, although providing a functional fiber-matrix interface which is quite prone to high-temperature oxidative deterioration if not properly protected, exhibits good compatibility with a number of different ceramic matrix materials, generally imparts excellent strength and toughness to such materials, and is compatible with a number of known oxidation protection schemes.

On the other hand, other fiber reinforcement subject to high-temperature oxidation damage can also be usefully employed in the invention. Such could include oxidizable fibers such as carbon or silicon nitride fibers, or oxide fibers of alumina, mullite, or the like which are not oxidizable per se but which may incorporate oxidatively unstable fiber-matrix interlayer coatings for enhanced composite performance. Even the latter fibers are expected to find utility for surface ply reinforcement in accordance with the invention, provided that oxidation protection in the form of a supplemental coating or the like is provided thereto.

The mode of fiber oxidation protection utilized in these composites for surface plies or ply stacks is not critical. Any of the known coating materials imparting oxidation protection to fibers prone to oxidation damage or embrittlement, including the known boron or other nitride coatings, as well as oxide coatings composed of sheet silicates (e.g., micas) or the like, may be used.

It will also be evident that the invention is not limited in its application to composites utilizing uniaxial fiber reinforcement (0/0° or parallel only fiber alignment). Other types of prepreg and/or composite architectures, including complex architectures such as multi-axial lay-ups (e.g., 0/90° or 0/+45/−45/90° fiber alignments within fiber plies in the ply stack) could be employed as well.

Finally, the invention extends to core/surface composites wherein the core is composed of composite materials other than fiber and/or whisker-reinforced glass-ceramics. Hence ceramic composite materials such as particle-toughened ceramics and glass-ceramics, or even monolithic ceramic materials such as high-strength monolithic glass-ceramics, could in principle be utilized as core components, provided that the physical properties of the selected core material are sufficiently closely matched to those of the surface portion of the composites to permit reasonably efficient load transfer among the core and surface components of the composite part.

Thus it can be seen that the invention uniquely applies design principles at the macroscopic or laminar level of composite structure to achieve significant improvements in mechanical character. This constitutes a completely different approach from past solutions to the oxidation embrittlement problem, which emphasize the more heavily studied microscopic interfacial composite parameters; the invention offers considerable economic advantages over many of these latter solutions.

We claim:

1. A ceramic matrix composite article comprising a ceramic matrix reinforced with refractory inorganic fibers, the article comprising a first ceramic material forming a core portion of the article and a second ceramic material composed of a fiber-reinforced glass-ceramic forming a surface portion of the article, the surface portion least partially covering the core portion and having a composition differing therefrom, wherein:

the surface portion is a fiber-reinforced glass-ceramic wherein the inorganic reinforcing fibers are provided with protection from high temperature oxidative deterioration.

2. A ceramic matrix composite article in accordance with claim 1 wherein the first ceramic material forming a core portion of the article is a composite glass-ceramic material reinforced with uncoated silicon carbide fibers.

3. A glass-ceramic matrix composite article comprising a glass-ceramic matrix reinforced with refractory inorganic reinforcing fibers, the article comprising a first fiber-reinforced glass-ceramic material forming a core portion of the article and a second fiber-reinforced glass-ceramic material forming a surface portion of the article, the surface portion least partially covering the core portion and the first fiber-reinforced glass-ceramic material differing in composition from the second fiber-reinforced glass-ceramic material, wherein;

the first fiber-reinforced glass-ceramic material forming the core portion has a structure selected from the group consisting of (a) a silicate glass-ceramic matrix reinforced with silicon carbide fibers and (b) a silicate glass-ceramic matrix reinforced with a combination of silicon carbide fibers and inorganic chopped fibers or whiskers; and the second fiber-reinforced glass-ceramic material comprises a glass-ceramic matrix reinforced with silicon carbide fibers, the silicon carbide fibers being provided with an oxidation-resistant surface coating.

4. A glass-ceramic matrix composite article in accordance with claim 3 wherein the silicon carbide fibers present in the first fiber-reinforced glass-ceramic material forming the core portion are uncoated silicon carbide fibers, and wherein the second fiber-reinforced glass-ceramic material forming the surface portion is substantially free of inorganic whiskers and chopped fibers.

5. A glass-ceramic matrix composite article in accordance with claim 4 wherein the surface portion of the article covers substantially all of the core portion thereof.

6. A glass-ceramic matrix composite article in accordance with claim 5 wherein the surface portion constitutes about 10-50% by volume of the article.

7. A glass-ceramic matrix composite article in accordance with claim 6 wherein the glass-ceramic matrix provided in the core and surface portions is an alkaline earth aluminosilicate glass-ceramic.

8. A glass-ceramic matrix composite article in accordance with claim 7 wherein the glass-ceramic matrix provided in the core and surface portions is a glass-ceramic wherein the principal crystal phase is selected from the group consisting of anorthite, mixed anorthite-alumina, and barium-stuffed cordierite.

9. A glass-ceramic composite article in accordance with claim wherein the oxidation-resistant surface coating provided on the silicon carbide fibers in the surface portion includes an oxidation resistant nitride or oxide layer.

10. A glass-ceramic composite article in accordance with claim 9 wherein the oxidation-resistant surface coating includes a boron nitride layer.

* * * * *